United States Patent

[11] 3,602,817

| [72] | Inventor | John Robert Nilson |
| | | Bedford, N.H. |
| [21] | Appl. No. | 827,390 |
| [22] | Filed | May 23, 1969 |
| [45] | Patented | Aug. 31, 1971 |
| [73] | Assignee | Beede Electrical Instrument Co., Inc. |
| | | Penacook, N.H. |

[54] ELECTRICAL TACHOMETER
2 Claims, 2 Drawing Figs.

[52] U.S. Cl. .................................................. 324/169,
324/78
[51] Int. Cl. ..................................................... G01p 3/48
[50] Field of Search .......................................... 324/15, 16,
69, 70, 78; 307/295, 233; 328/140

[56] References Cited
UNITED STATES PATENTS
| 2,934,703 | 4/1960 | Cohen | 324/70 |
| 3,202,910 | 8/1965 | Fathauer | 324/70 |

Primary Examiner—Michael J. Lynch
Attorney—Weingarten, Maxham & Schurgin

ABSTRACT: An electrical tachometer operative with an ignition system of an internal combustion engine to measure engine speed accurately in the presence of spurious input conditions. A transistor switch operates in response to the voltage drop across the ignition system ballast resistor to provide an output signal substantially immune to varying input conditions and effective to drive a current meter calibrated to indicate engine speed.

PATENTED AUG 31 1971 3,602,817

INVENTOR.
JOHN ROBERT NILSON
BY
ATTORNEY

ELECTRICAL TACHOMETER

FIELD OF THE INVENTION

This invention relates to electrical tachometers and more particularly to a tachometer especially adapted for use with an ignition system of an internal combustion engine and in which accurate speed indication is achieved in the presence of spurious input conditions.

BACKGROUND OF THE INVENTION

Electrical tachometers are often employed to determine the rotational crankshaft speed of an internal combustion engine. In conventional devices, the voltage change across the ignition breaker points is sensed and processed to provide an indication of engine speed, or the current through the ignition coil is sensed usually by a current transformer to provide an indication of engine speed. There is a major problem, however, in sensing the voltage across the breaker points as high voltage transients occur which can damage the electrical circuitry employed. Conventional current sensing techniques are often similarly disadvantageous in that a cumbersome and expensive transformer is employed for current sensing and, in addition, ignition performance is often degraded by the addition of such current sensing apparatus.

SUMMARY OF THE INVENTION

In accordance with the present invention, an electrical tachometer is provided in which accurate speed indication is provided in the presence of widely varying input conditions. The tachometer is substantially immune to input transients and varying input voltage and is operative over a wide temperature range without degradation of performance. In brief, the voltage drop across the ballast resistor associated with the ignition coil of an ignition system is employed to trigger a solid state switch which is operative to provide a clean rectangular wave of a frequency determined by engine speed and an amplitude independent of battery or alternator voltage. The switch is operative to drive a current meter through a stable capacitor, the inverse reactance/frequency characteristics of which provides average current proportional to frequency. The tachometer according to the invention is effectively insensitive to dwell variations and voltage variations and does not reduce the spark efficiency of the ignition system with which it is employed. Moreover, the meter resistance is not critical to proper tachometer operation thereby reducing the cost of the device since meter manufacturing tolerances can be relatively broad. Tachometer accuracy is maintained over a wide range of input conditions by reason of the provision of a clean metering signal which retains its form irrespective of input signal variations and noise. In addition, the tachometer is not subject to damage from inductive transients since such transients are effectively isolated from the measuring circuitry.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
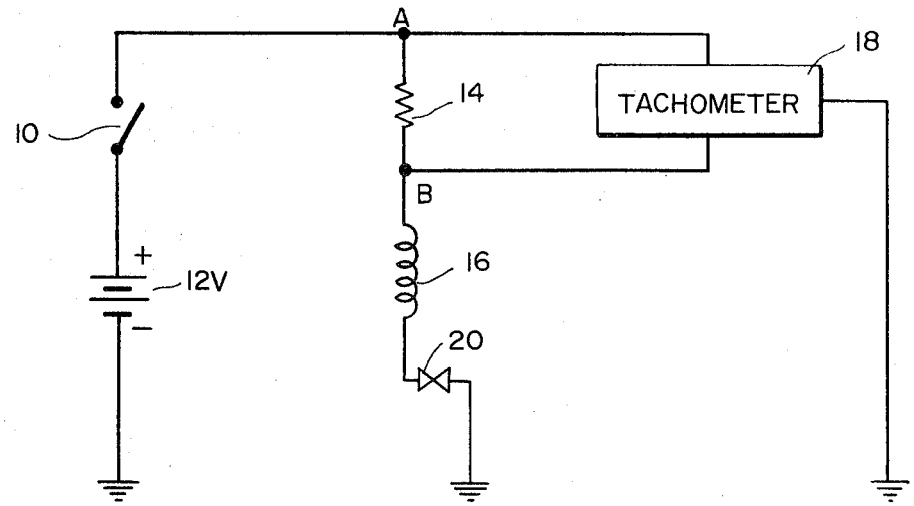
FIG. 1 is a schematic representation of an internal combustion engine ignition system employing a tachometer according to the present invention.

Referring to FIG. 1 there is shown an internal combustion engine ignition system including an ignition switch 10 in series with a storage battery 12, the negative terminal of which in the illustrated embodiment is connected to ground. The primary winding 16 of an ignition coil is connected by means of breaker points 20 to ground and by means of a ballast resistor 14 to the other side of ignition switch 10. A tachometer 18 embodying the present invention is connected to respective terminals of ballast resistor 14 these terminals being denoted A and B in FIG. 1. A third tachometer lead is connected to ground. The voltage drop across the ballast resistor 14 produce during each current pulse flowing in the ignition primary circuit is employed with the improved circuitry to achieve enhanced tachometer performance without degradation of the associated ignition system. The input signals to the tachometer are derived from the current pulses flowing through ballast resistor 14 and are reasonably free from transients by reason of the inductance of the ignition coil primary 16.

Figure 2:
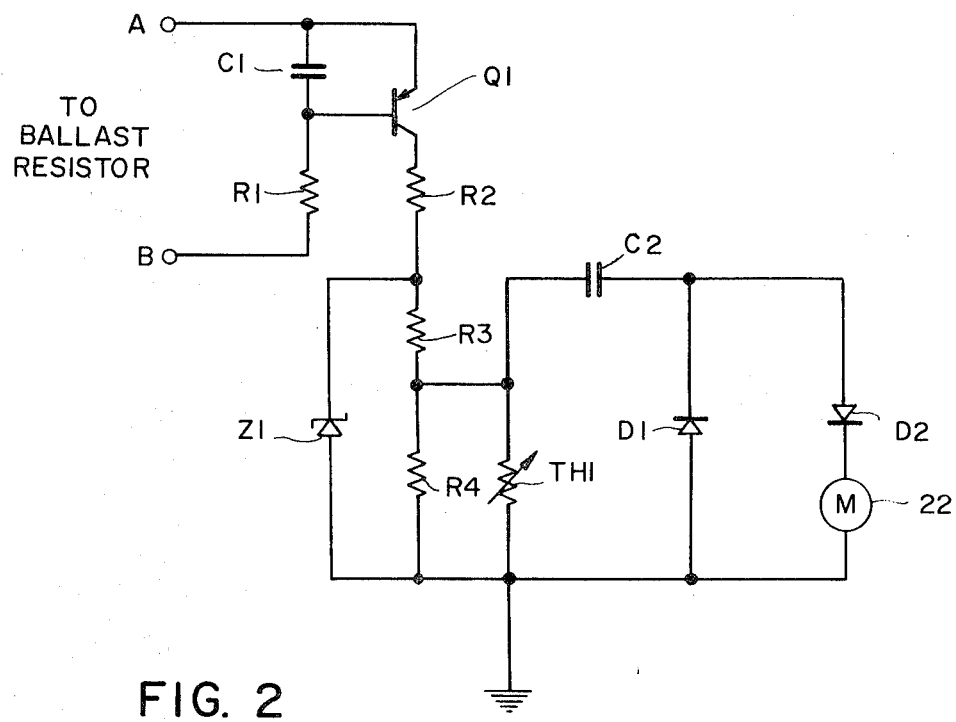
FIG. 2 is a schematic representation of a tachometer embodying the invention.

The tachometer circuitry is shown more fully in FIG. 2 and includes a capacitor C1 connected in series with resistor R1 across input terminals A and B the common junction of the series connected resistor and capacitor being connected to the base of transistor Q1. The emitter of transistor Q1 is connected to the input terminal A while the collector is connected to a string of series resistors R2, R3 and R4 the opposite end of the resistance string being grounded. A Zener diode Z1 is connected with its anode to ground and its cathode to the junction of resistors R2 and R3. The junction of resistors R3 and R4 is coupled via a differentiating capacitor C2 to a pair of oppositely poled diodes D1 and D2 connected as shown with a meter 22. Resistor R1 provides current limiting and in conjunction with capacitor C1 acts as a high frequency filter to reduce high frequency components applied to the switching circuitry. A thermistor TH1 is connected between the junction of resistors R3 and R4 and ground to provide temperature compensation.

Transistor Q1 is switched to its fully conducting state by application of a suitable potential across input points A and B derived from the current pulse through the ballast resistor and operates in saturation to provide a clipped waveform. The collector-emitter voltage of transistor Q1 is saturation limited with the transistor conducting. A rectangular wave is produced having a frequency determined by the engine speed and an amplitude which is determined by the voltage drop across the reverse biased Zener diode Z1 and is substantially independent of battery or alternator voltage. A signal derived by the voltage divider formed by series resistors R2, R3 and R4 is applied to a stable capacitor C2 which is operative to differentiate the wave for application of a signal to meter 22. Capacitor C2 is charged through diode D2 and meter 22 and discharged through diode D1.

The short duty cycle of the differentiating circuitry renders the tachometer effectively immune to dwell angle variations and breaker point conductivity, and the voltage regulation afforded by the Zener diode eliminates dependence of the circuit upon battery or alternator voltage. In addition, the tachometer circuitry is isolated from the input circuitry by a transistor switch causing operating power to be derived from the battery/alternator rather than from the ignition current, with the result that variations in input conditions do not materially affect tachometer accuracy or operation, and moreover, tachometer operation does not materially affect ignition performance. The input transistor stage is of high gain and allows use of the invention with sinusoidal, square or nonsymmetrical waves without recalibration.

Various modifications and alternative implementations of the invention will now occur to those versed in the art without departing from the spirit and true scope of the invention. For example, a positive ground can be employed in place of the illustrated negative ground system, and variations in the illustrated circuits can be made to suit particular requirements. Accordingly the invention is not to be limited by what has been particularly shown and described herein.

I claim:

1. For use with an internal combustion engine ignition system having a ballast resistor in series with the primary winding of the ignition coil, a tachometer for measuring engine speed in the presence of spurious input conditions, comprising:

a solid state switch having first and second input terminals adapted for connection across said ballast resistor and operative in response to current pulses therethrough to provide a clipped and regulated output signal of a frequency related to engine speed and amplitude substantially independent of variations in input voltage, said solid state switch including:

a transistor;

a series connected resistor and capacitor connected in the order named across said first and second input terminals, the base of said transistor being connected to the junction of said resistor and capacitor, the emitter of said transistor being connected to said second input terminal;

a voltage divider connected between the collector of said transistor and a source of ignition system ground potential and defining an output circuit of said switch;

a thermistor connected in the output circuit of said switch for temperature compensation;

a reverse biased Zener diode connected across said voltage divider;

a capacitor having a terminal connected to the output of said voltage divider; and current responsive means including first and second oppositely poled diodes connected between the other terminal of said capacitor and said source of ground potential and operative to provide a charging and discharging path, respectively, for said capacitor, and a meter in series with said oppositely poled diodes and operative in response to the average current through said capacitor to provide an indication of the magnitude of said average current, said magnitude being representative of engine speed.

2. For use with an internal combustion engine ignition system having a ballast resistor in series with the primary winding of the ignition coil, a tachometer for measuring engine speed in the presence of spurious input conditions, comprising:

a solid state switch having first and second input terminals adapted for connection across said ballast resistor and operative in response to current pulses therethrough to provide a clipped and regulated output signal of a frequency related to engine speed and amplitude substantially independent of variations in input voltage, said solid state switch including:

a transistor having base, emitter and collector electrodes;

a series-connected resistor and capacitor connected in the order named across said first and second input terminals, the base of said transistor being connected to the junction of said resistor and capacitor, the emitter of said transistor being connected to said second input terminal;

a voltage divider having a plurality of series-connected resistors connected between the collector of said transistor and a source of ignition system ground potential and having an output at the junction of a pair of said resistors;

a reverse biased Zener diode connected across said pair of said resistors of said voltage divider, and a thermistor connected between the output of said voltage divider and said source of ground potential for providing temperature compensation;

a capacitor having a terminal connected to the output of said voltage divider; and current response means including a first diode connected between the other terminal of said capacitor and said source of ground potential, and a current responsive meter and a second oppositely poled diode series-connected in shunt with said first diode, said first and second diodes being operative to provide a respective charging and discharging path for said capacitor, said meter being operative to provide an indication of the magnitude of average current through said capacitor, said magnitude being representative of engine speed.